(12) United States Patent
Matsunaga

(10) Patent No.: US 12,110,008 B2
(45) Date of Patent: Oct. 8, 2024

(54) AUTOMATIC PARKING MANAGEMENT APPARATUS

(71) Applicant: TOYOTA JIDOSHA KABUSHIKI KAISHA, Toyota (JP)

(72) Inventor: Issei Matsunaga, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/130,678

(22) Filed: Apr. 4, 2023

(65) Prior Publication Data
US 2023/0249676 A1 Aug. 10, 2023

Related U.S. Application Data

(63) Continuation of application No. 16/742,455, filed on Jan. 14, 2020, now Pat. No. 11,654,894.

(30) Foreign Application Priority Data

Jan. 18, 2019 (JP) ................. 2019-005051

(51) Int. Cl.
*B60W 30/06* (2006.01)
*B62D 15/02* (2006.01)
*G08G 1/16* (2006.01)

(52) U.S. Cl.
CPC ......... *B60W 30/06* (2013.01); *B62D 15/0285* (2013.01); *G08G 1/168* (2013.01)

(58) Field of Classification Search
CPC .............................. B60W 30/06; B60W 30/09
USPC ........................................................ 701/25
See application file for complete search history.

(56) References Cited

U.S. PATENT DOCUMENTS

| 9,896,091 | B1 | 2/2018 | Kurt | |
| 2018/0215376 | A1* | 8/2018 | Kuhara | ................ G05D 1/0212 |
| 2018/0362023 | A1* | 12/2018 | Kim | .................. B62D 15/0285 |
| 2019/0243392 | A1 | 8/2019 | Ding | |
| 2019/0351899 | A1 | 11/2019 | Adam | |

FOREIGN PATENT DOCUMENTS

| CN | 108376323 A | 8/2018 |
| CN | 108372858 B | 7/2022 |
| JP | 2014227021 A | 12/2014 |
| JP | 2015074321 A | 4/2015 |
| JP | 2015096411 A | 5/2015 |

OTHER PUBLICATIONS

U.S. Appl. No. 16/742,455, filed Jan. 14, 2020, Issei Matsunaga.

* cited by examiner

*Primary Examiner* — Peter D Nolan
*Assistant Examiner* — Luke Huynh
(74) *Attorney, Agent, or Firm* — Dinsmore & Shohl LLP

(57) ABSTRACT

An automatic parking management apparatus is applied to a parking lot that allows an automatic parking control of automatically parking a vehicle, which is stopped at a start position, into a parking space. The automatic parking management apparatus is provided with: a determinator configured to determine whether or not the vehicle is stopped in a predetermined range for defining the start position, when the automatic parking control is intended to be started; and an instructor configured to output an instruction to move into the predetermined range, to the vehicle, if it is determined that the vehicle is not stopped in the predetermined range.

6 Claims, 6 Drawing Sheets

AUTOMATIC PARKING MANAGEMENT APPARATUS

CROSS-REFERENCE TO RELATED APPLICATIONS

This application is a continuation of U.S. patent application Ser. No. 16/742,455 filed Jan. 14, 2020 and claims priority to Japanese Patent Application No. 2019-005051, filed on Jan. 16, 2019, the entire contents of which are incorporated herein by reference.

BACKGROUND

1. Technical Field

Embodiments of the present disclosure relate to an automatic parking management apparatus, which is applied to a parking lot that allows automatic parking or automated parking.

2. Description of the Related Art

For this type of apparatus, there is known an apparatus configured to manage the parking of a vehicle by automatic or automated travel (hereinafter referred to as "automatic parking" as occasion demands). For example, Japanese Patent Application Laid Open No. 2014-227021 (Patent Literature 1) discloses an apparatus configured to generate a path or route to a designated target parking position and configured to enable a vehicle to perform the automatic parking.

In order to perform the automatic parking with precision, it is necessary to accurately detect a current position of a vehicle (in other words, a position when the automatic parking is started). For this purpose, a policy of setting a sensor-rich area only in a partial area of a parking lot (e.g., near a start position of the automatic parking) is adopted in many cases, because it costs a lot to provide a high-precision position sensor on a vehicle side.

Not all the vehicles that are intended to automatically park, however, stop in the sensor-rich area. For example, even if the sensor-rich area is set as the start position of the automatic parking, it is considered that there are some vehicles that stick out of the area and stop. In such a case, the positions of the vehicles cannot be accurately detected, so that it is hardly possible to perform the automatic parking with precision (in other words, it is hardly possible to normally start the automatic parking), which is technically problematic.

SUMMARY

In view of the aforementioned problem, it is therefore an object of embodiments of the present disclosure to provide an automatic parking management apparatus that can perform a high-precision automatic parking control by accurately detecting a vehicle position.

An aspect of an automatic parking management apparatus according to the present disclosure is an automatic parking management apparatus, which is applied to a parking lot that allows an automatic parking control of automatically parking a vehicle, which is stopped at a start position, into a parking space, the automatic parking management apparatus provided with: a determinator configured to determine whether or not the vehicle is stopped in a predetermined range for defining the start position, when the automatic parking control is intended to be started; and an instructor configured to output an instruction to move into the predetermined range, to the vehicle, if it is determined that the vehicle is not stopped in the predetermined range.

DETAILED DESCRIPTION OF THE EMBODIMENT

Hereinafter, an automatic parking management apparatus according to an embodiment of the present disclosure will be explained with reference to the drawings.

<Configuration of Apparatus>

Figure 1:
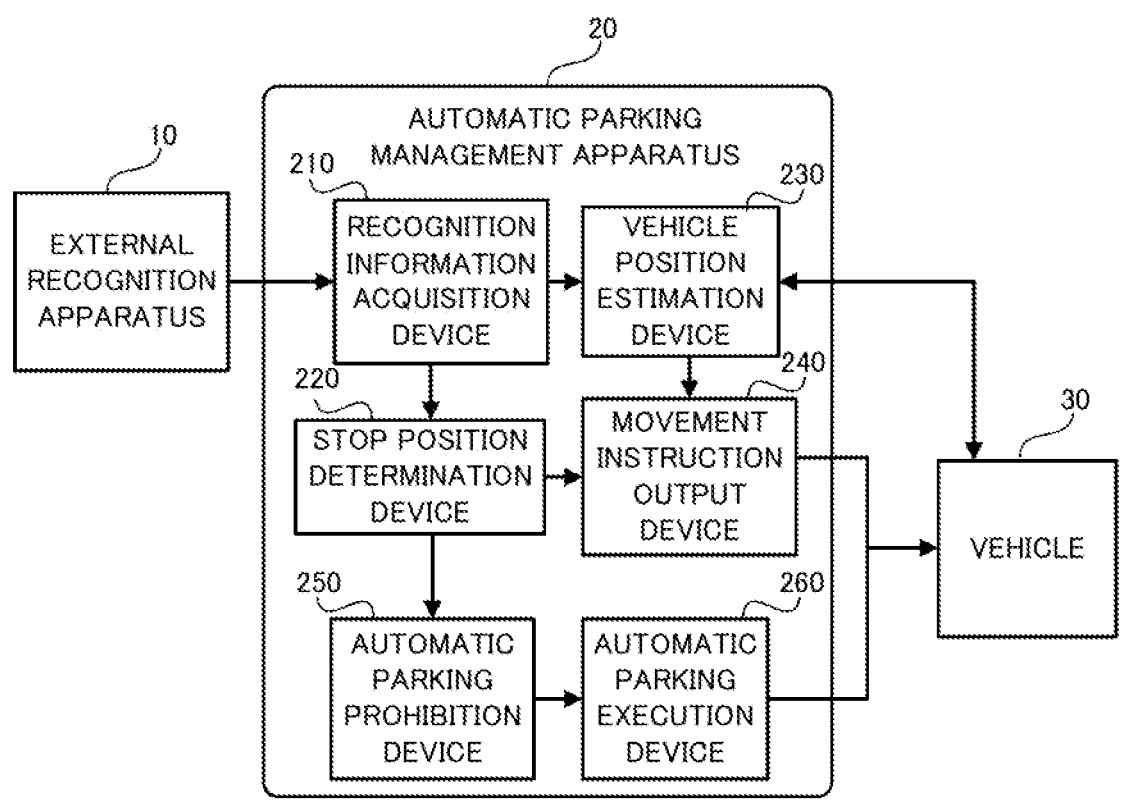
FIG. 1 is a block diagram illustrating a configuration of an automatic parking management apparatus according to an embodiment.

Firstly, a configuration of the automatic parking management apparatus according to the embodiment will be explained with reference to FIG. 1. FIG. 1 is a block diagram illustrating the configuration of the automatic parking management apparatus according to the embodiment.

In FIG. 1, an automatic parking management apparatus 20 according to the embodiment may be an apparatus that is applied to a parking lot that allows an automatic or automated parking control (i.e., a so-called automated valet parking lot), and is configured, for example, as a part of a parking lot administrative or management server. The automatic parking management apparatus 20 is configured to perform the automatic parking control on a vehicle 30 by using recognition information obtained from an external recognition apparatus 10, which includes, for example, a camera. The automatic parking management apparatus 20 is provided with a recognition information acquisition device 210, a stop position determination device 220, a vehicle position estimation device 230, a movement instruction output device 240, an automatic parking prohibition device 250, and an automatic parking execution device 260, as logical processing blocks or physical processing circuits to realize functions thereof.

The recognition information acquisition device 210 is configured to obtain the recognition information (e.g., a position or posture of a vehicle, identification information, etc.) from the external recognition apparatus 10. The recognition information obtained by the recognition information acquisition device 210 may be outputted to each of the stop position determination device 220 and the vehicle position estimation device 230.

The stop position determination device 220 is configured to determine a stop position of the vehicle 30 on the basis of the recognition information obtained by the recognition information acquisition device 210. Specifically, the stop position determination device 220 is configured to determine whether the vehicle 30 is stopped in a start area, in an allowed area, or in another area. The start area and the allowed area will be explained in detail later. A determination result of the stop position determination device 220 may be outputted to each of the movement instruction output device 240 and the automatic parking prohibition device 250. The stop position determination device 220 is a specific example of the "determinator" in Supplementary Notes described later.

The vehicle position estimation device 230 is configured to estimate a current position of the vehicle 30 (which is particularly a position in the allowed area) on the basis of an initial position and a movement history, which are obtained from the vehicle 30. A specific position estimation method performed by the vehicle position estimation device 230 will be explained in detail later. An estimation result of the vehicle position estimation device 230 may be outputted to the movement instruction output device 240.

The movement instruction output device 240 is configured to output an instruction to move into the start area, to the vehicle 30 that is stopped outside the start area. A specific movement instruction method performed by the movement instruction output device 240 will be explained in detail later. The movement instruction output device 240 is a specific example of the "instructor" in Supplementary Notes described later.

The automatic parking prohibition device 250 is configured to allow the start of the automatic parking control for the vehicle 30 that is stopped in the start area, and is configured to prohibit the start of the automatic parking control for the vehicle 30 that is stopped outside the start area. Specifically, the automatic parking prohibition device 250 is configured to allow and prohibit the automatic parking control by controlling the operation of the automatic parking execution device 260. The automatic parking prohibition device 250 is a specific example of the "prohibitor" in Supplementary Notes described later.

The automatic parking execution device 260 is configured to perform the automatic parking control on the vehicle 30 by controlling the travel of the vehicle 30. More specifically, the automatic parking execution device 260 may output an instruction to control an accelerator actuator, a brake actuator, a steering actuator, or the like, to the vehicle 30, thereby performing the automatic parking control on the vehicle 30. A more detailed explanation of the automatic parking control will be omitted herein because the existing technologies/techniques can be applied, as occasion demands.

Technical Problem

Figure 2:
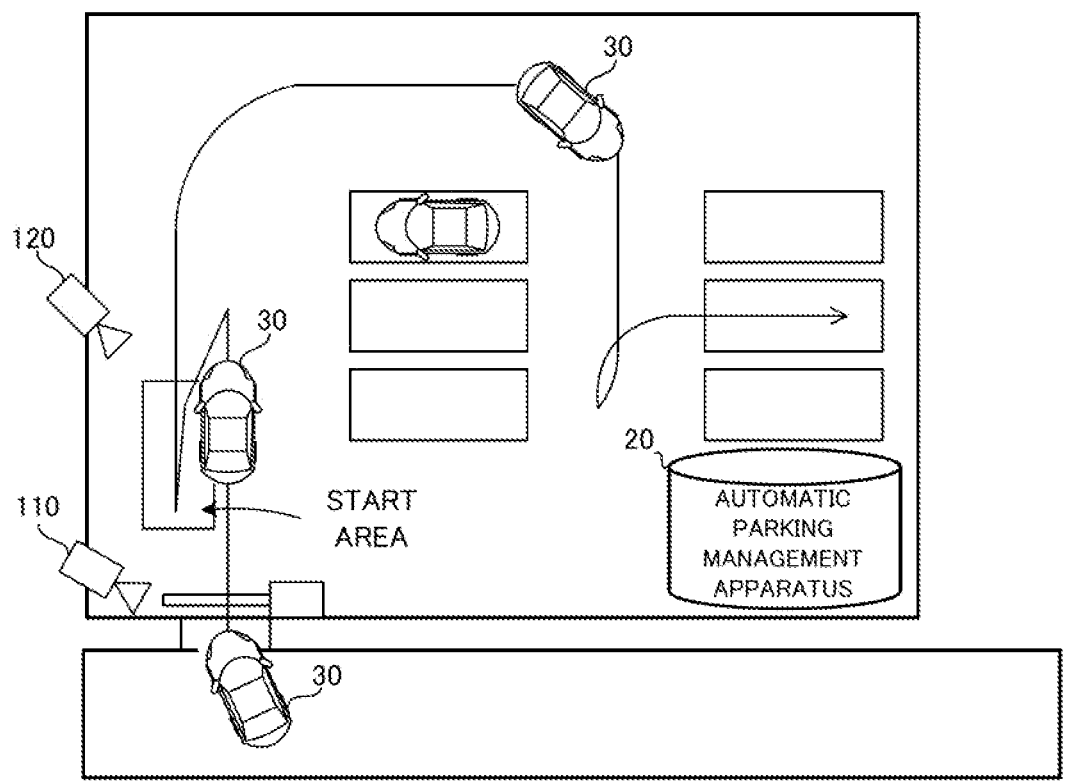
FIG. 2 is a plan view illustrating an example of a parking lot, which is provided with the automatic parking management apparatus according to the embodiment.

Next, with reference to FIG. 2, an explanation will be given to a configuration of the parking lot provided with the automatic parking management apparatus 20 according to the embodiment, and a technical problem that can occur in the parking lot. FIG. 2 is a plan view illustrating an example of the parking lot, which is provided with the automatic parking management apparatus according to the embodiment.

As illustrated in FIG. 2, a camera 110 configured to image a situation near an entrance and a camera 120 configured to image a situation near the start area are placed in the parking lot provided with the automatic parking management apparatus 20 according to the embodiment. The cameras 110 and 120 may constitute a part of the external recognition apparatus 10. In the parking lot, another camera, whose illustration is omitted herein, may be also placed, other than the cameras 110 and 120.

The vehicle 30 that enters the parking lot may firstly stop in the start area. The start area may be an area for defining a start position of the automatic parking control, and is a specific example of the "predetermined range" in Supplementary Notes described later. Since the camera 120 is placed near the start area, the position or posture (or direction) of the vehicle 30 in the start area can be detected with high precision. Here, a target parking position (i.e., a position to park the vehicle 30) by the automatic parking control may be outputted as information indicating a relative position to the position of the vehicle 30 at a start time point of the automatic parking control. It is thus possible to improve control accuracy by starting the automatic parking control from inside the start area, which has high detection accuracy. More specifically, it is possible to reduce the deviation of a travel path or route to a parking space in which the vehicle 30 is intended to be parked, the deviation of a parking position in the parking space, or the like.

Not all the vehicles 30, however, stop in the start area. Since the vehicle travels to the start position due to a driving operation of an occupant, the vehicle may significantly deviate from the start area and stop, as illustrated in FIG. 2, depending on the driving operation. In such a case, the vehicle 30 deviates from an angle of view of the camera 120 (or the vehicle 30 is at a position at which there is a significant influence of distortion of the camera 120), and it is thus hard to accurately detect the position or posture of the vehicle 30. There is thus a possibility that the automatic parking control cannot be performed with precision. The start of the automatic parking control without a change may cause a significant deviation, which may also cause a risk of a collision between the vehicle 30 and another vehicle, an obstacle, or the like.

In order to solve the aforementioned technical problem, the automatic parking management apparatus 20 according to the embodiment is configured to perform the operations explained below.

<Explanation of Operation>

Figure 3:
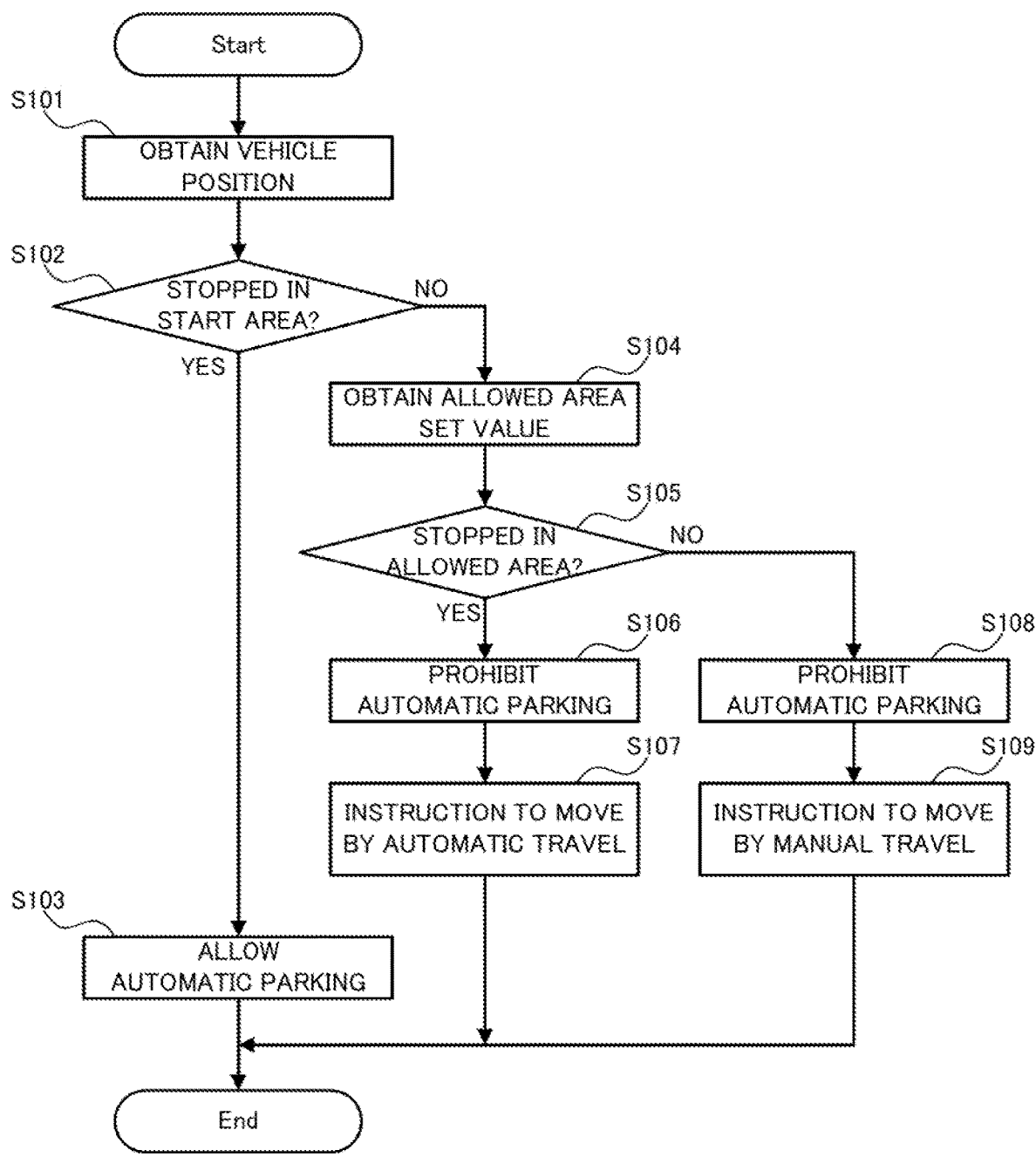
FIG. 3 is a flowchart illustrating a flow of operations of the automatic parking management apparatus according to the embodiment.

Next, a flow of the operations of the automatic parking management apparatus 20 according to the embodiment will be explained with reference to FIG. 3. FIG. 3 is a flowchart illustrating the flow of the operations of the automatic parking management apparatus according to the embodiment.

As illustrated in FIG. 3, in operation of the automatic parking management apparatus 20 according to the embodiment, the stop position determination device 220 firstly obtains the position of the vehicle 30 that is intended to start the automatic parking control (step S101). More specifically, when a new vehicle 30 enters the parking lot, the vehicle position estimation device 230 may obtain the position of the vehicle 30 on the basis of the recognition information obtained by the recognition information acquisition device 210 (which is mainly information that can be recognized from images taken by the camera 120).

The stop position determination device 220 then determines whether or not the position of the vehicle 30 is in the start area (step S102). In other words, the stop position determination device 220 may determine whether or not the vehicle 30 is stopped in an area in which the position or posture can be detected with high precision. If the position of the vehicle 30 is not in the start area, as already described above, it is hard to accurately detect the position or posture of the vehicle 30 from the images taken by the camera 120. However, even if the position or posture of the vehicle 30 is not accurately detected, it is possible to determine whether or not the position of the vehicle 30 is in the start area, as long as a position relation between the vehicle 30 and the start area is recognized from the images taken by the camera 120.

If it is determined that the vehicle 30 is stopped in the start area (the step S102: YES), the automatic parking prohibition device 250 allows the start of the automatic parking control (step S103). Thus, in this case, the automatic parking control is started by the automatic parking execution device 260.

On the other hand, if it is determined that the vehicle 30 is not stopped in the start area (the step S102: NO), the stop position determination device 220 obtains an allowed area set value (step S104). The allowed area set value may be a value for determining the magnitude of the allowed area.

Figure 4:
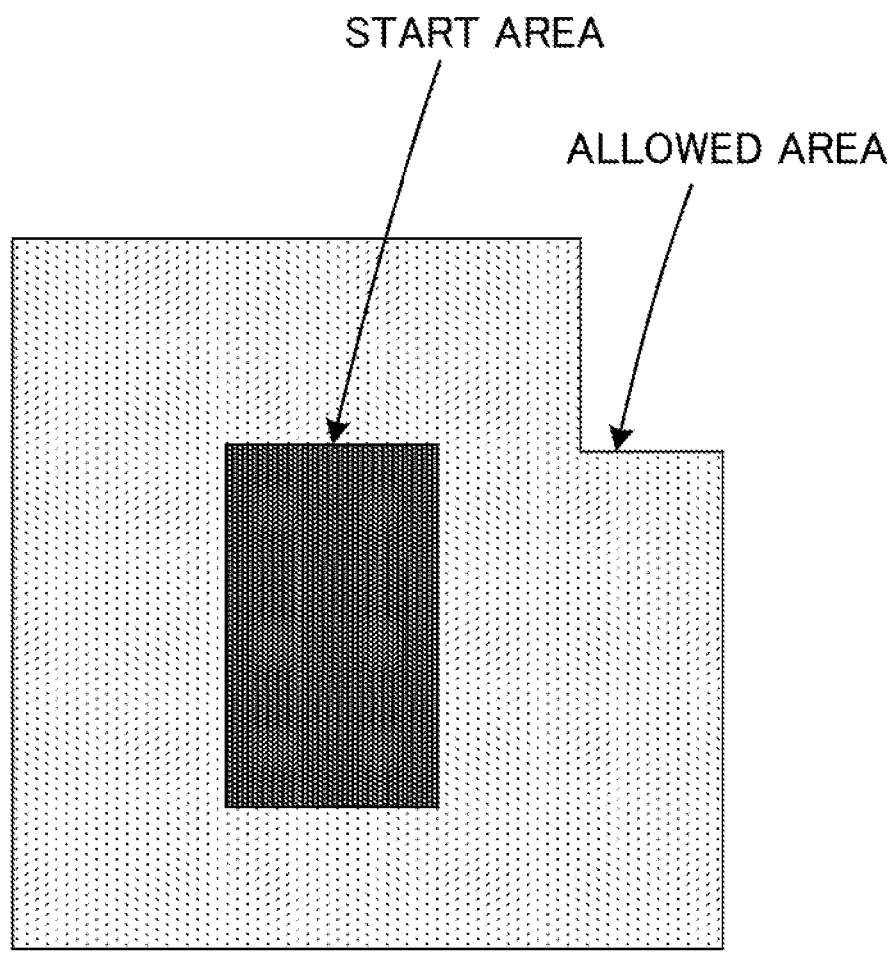
FIG. 4 is a plan view illustrating an example of a start area and an allowed area.

Now, the allowed area will be specifically explained with reference to FIG. 4. FIG. 4 is a plan view illustrating an example of the start area and the allowed area.

As illustrated in FIG. 4, the allowed area may be an area set around the start area, and may be set as an area in which the vehicle can safely travel to the start area by automatic or automated travel. The magnitude of the allowed area, as explained above, may be determined by the allowed area set value. For example, the width of the allowed area (i.e., a width from an edge of the start area) may correspond to the allowed area set value. The allowed area set value may be a fixed value, which is set in advance, for example, on the basis of a structure of the parking lot or the like, and in this case, the magnitude of the allowed area may be fixed. On the other hand, the allowed area set value may be a variable value, which varies depending on the position of another vehicle that is in the parking lot, or the like, and in this case, the magnitude of the allowed area may vary depending on situations. For example, if there is another vehicle near the start area, it can be determined that there is a high possibility of collision, and thus, the allowed area set value may be set as a relatively small value (i.e., the allowed area may be set as a relatively small area). On the other hand, if there is no obstacle near the start area, it can be determined that there is a low possibility of collision, and thus, the allowed area set value may be set as a relatively large value (i.e., the allowed area may be set as a relatively large area).

Back in FIG. 3, the stop position determination device 220 that obtains the allowed area set value determines whether or not the vehicle 30 is stopped in the allowed area (step S105). For the same reason as those when it is determined whether or not the position of the vehicle 30 is in the start area, even if the position or posture of the vehicle 30 is not accurately detected, it is possible to determine whether or not the vehicle 30 is in the allowed area, as long as a position relation between the vehicle 30 and the allowed area is recognized from the images taken by the camera 120. In this case, however, all (or a part in some cases) of the allowed area is preferably included in the angle of view of the camera 120. If it is determined that the vehicle 30 is stopped in the allowed area (the step S105: YES), the automatic parking prohibition device 250 prohibits the start of the automatic parking control (step S106). Then, the movement instruction output device 240 outputs a movement instruction to the vehicle 30 to move into the start area by automatic travel (step S107).

On the other hand, if it is determined that the vehicle 30 is not stopped in the allowed area (in other words, if it is determined that the vehicle 30 is parked outside the allowed area) (the step S105: NO), the automatic parking prohibition device 250 prohibits the start of the automatic parking control (step S108). Then, the movement instruction output device 240 outputs a movement instruction to the vehicle 30 to move into the start area by manual travel (step S109).

<Instruction to Move by Automatic Travel>

In the case of the instruction to move by automatic travel (refer to the step S107 in FIG. 3), it is necessary to know an accurate position of the vehicle 30 to move the vehicle 30 into the start area with precision. In the allowed area, however, the accuracy of the position information or recognition information recognized by the external recognition apparatus 10 is not high. Thus, the vehicle position estimation device 230 may estimate the current position of the vehicle 30 by using the initial position and the movement history of the vehicle 30.

Figure 5:
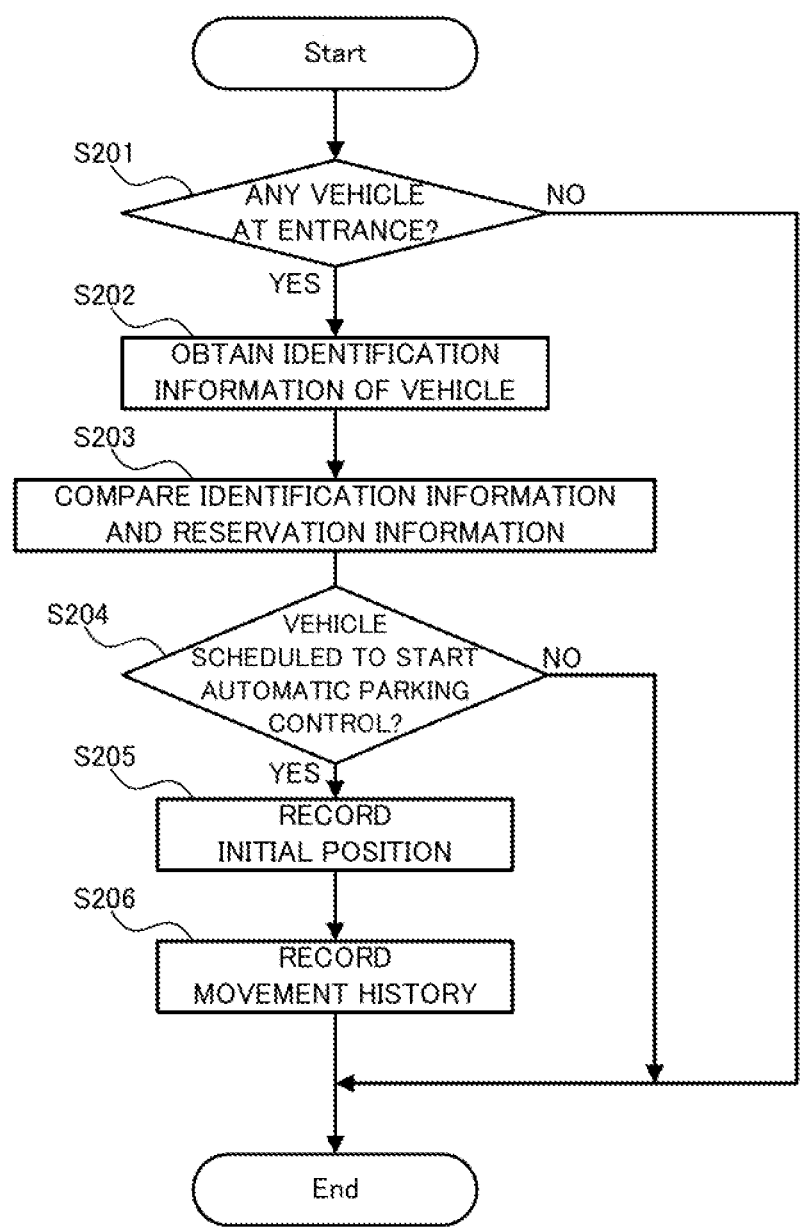
FIG. 5 is a flowchart illustrating a flow of an operation of storing an initial position and a movement history.

Firstly, with reference to FIG. 5, an explanation will be given to an operation of storing the initial position and the movement history of the vehicle 30. FIG. 5 is a flowchart illustrating a flow of the operation of storing the initial position and the movement history. Steps explained below in the flowchart illustrated in FIG. 5 may be performed when the vehicle 30 enters the parking lot, i.e., before the vehicle 30 stops in the start area or in its vicinity with an intention to start the automatic parking control.

As illustrated in FIG. 5, the vehicle position estimation device 230 firstly determines whether or not there is the vehicle 30 at the entrance of the parking lot (step S201). Whether or not there is the vehicle 30 at the entrance of the parking lot can be determined from images taken by the camera 110 (refer to FIG. 2) or the like. If it is determined that there is no vehicle 30 at the entrance of the parking lot (the step S201: NO), the subsequent process is omitted, and a series of steps is ended. In this case, the step S201 may be started after a lapse of a predetermined period.

If it is determined that there is the vehicle 30 at the entrance of the parking lot (the step S201: YES), the vehicle position estimation device 230 obtains identification information of the vehicle 30 (step S202). The identification information of the vehicle 30 may be, for example, information about a number plate, and can be obtained from the images taken by the camera 110, or the like.

Then, the vehicle position estimation device 230 compares the obtained identification information and information about reservation of the parking lot (step S203), and determines whether or not the vehicle 30 that is at the entrance is a vehicle that is scheduled to start the automatic parking control (step S204). The parking lot that allows the automatic parking control may be used on the premise that a reservation is made in advance, and it is necessary to input the identification information in the reservation. It is thus possible to determine whether or not the vehicle 30 is scheduled to start the automatic parking control by comparing the identification information obtained in the step S202 and the identification information inputted in the reservation.

If it is determined that the vehicle 30 is not scheduled to start the automatic parking control (the step S204: NO), the subsequent process is omitted, and a series of steps is ended. On the other hand, if it is determined that the vehicle 30 is scheduled to start the automatic parking control (the step S204: YES), the vehicle position estimation device 230 outputs an instruction, to the vehicle 30, to store the current position of the vehicle 30 (i.e., the position near the entrance) as the initial position (step S205). Then, the vehicle position estimation device 230 further outputs an instruction, to the vehicle 30, to store the subsequent movement history of the vehicle 30 (i.e., information about a vehicle speed, information about a steering angle, etc.) (step S206).

The initial position of the vehicle 30 described above is not necessarily the position of the vehicle 30 at the entrance of the parking lot. In other words, any position that is passed by the vehicle 30 that enters the parking lot may be stored as the initial position.

Figure 6:
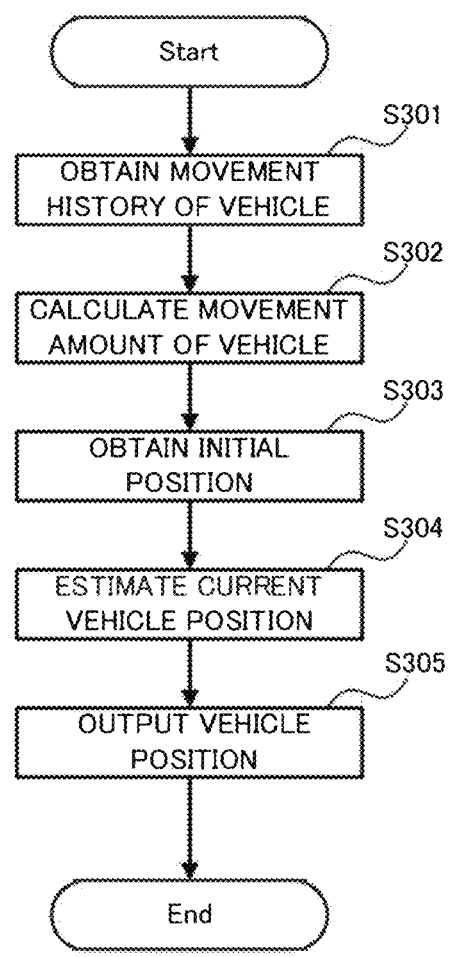
FIG. 6 is a flowchart illustrating a flow of an operation of generating a movement path by automatic travel.

Next, with reference to FIG. 6, an explanation will be given to an operation of generating a movement path by automatic travel from the initial position and the movement history of the vehicle 30. FIG. 6 is a flowchart illustrating a flow of the operation of generating the movement path by automatic travel. Steps explained below in the flowchart illustrated in FIG. 6 may be performed if it is determined to give an instruction to move by automatic travel.

As illustrated in FIG. 6, when it is determined to give the instruction to move by automatic travel, the vehicle position estimation device 230 firstly obtains the movement history stored in the vehicle 30 (step S301). The vehicle position estimation device 230 then estimates a movement amount of the vehicle 30 from information about the movement history obtained (step S302). A detailed explanation of a specific method of calculating the movement amount from the movement history is omitted herein because the existing technologies/techniques can be applied, as occasion demands.

Then, the vehicle position estimation device 230 obtains the initial position stored in the vehicle 30 (step S303). The vehicle position estimation device 230 then estimates the current position of the vehicle 30 from the initial position and the movement amount (step S304). Specifically, the vehicle position estimation device 230 may estimate the current position of the vehicle 30 by adding the movement amount to the initial position.

After that, the vehicle position estimation device 230 outputs the estimated position of the vehicle 30 to the movement instruction output device 240 (step S305). The operation described above allows the movement instruction output device 240 to accurately arithmetically operate a path or route to move into the start area from the current position of the vehicle 30.

Technical Effect

Next, an explanation will be given to a technical effect obtained by the automatic parking management apparatus 20 according to the embodiment.

As explained in FIG. 1 to FIG. 5, according to the automatic parking management apparatus 20 in the embodiment, when the vehicle 30 is not stopped in the start area of the automatic parking control, the movement instruction may be outputted to the vehicle 30 to move into the start area. Thus, the vehicle 30 is moved into the start area, and as a result, it is possible to normally start the automatic parking control. In other words, it is possible to accurately detect the position of the vehicle 30 and to perform the high-precision automatic parking control. Since the start of the automatic parking control is prohibited until the vehicle 30 moves into the start area, it is possible to prevent the automatic parking control from being started in an inappropriate condition.

Moreover, particularly in the embodiment, the instruction to move by automatic travel is outputted when the vehicle 30 is stopped in the allowed area. It is thus possible to start the automatic parking control without increasing an occupant's load. On the other hand, when the vehicle 30 is stopped outside the allowed area, the instruction to move by manual travel is outputted. It is thus possible to avoid a collision caused by that the position of the vehicle 30 cannot be accurately recognized, or the like.

Supplementary Notes

Various aspects of embodiments of the present disclosure derived from the embodiment explained above will be explained hereinafter.

Supplementary Note 1

An automatic parking management apparatus described in Supplementary Note 1 is an automatic parking management apparatus, which is applied to a parking lot that allows an automatic parking control of automatically parking a vehicle, which is stopped at a start position, into a parking space, the automatic parking management apparatus provided with: a determinator configured to determine whether or not the vehicle is stopped in a predetermined range for defining the start position, when the automatic parking control is intended to be started; and an instructor configured to output an instruction to move into the predetermined range, to the vehicle, if it is determined that the vehicle is not stopped in the predetermined range.

According to the automatic parking management apparatus described in Supplementary Note 1, when the vehicle is not stopped in the predetermined range for defining the start position (which is typically a range in which the position of the vehicle can be recognized with high precision), an instruction is given to the vehicle to move into the predetermined range. Specifically, a travel or cruise control instruction for moving the vehicle into the predetermined range by automatic travel, an information display for moving the vehicle into the predetermined range by manual travel, or the like may be performed. As a result, it is possible to start the automatic parking control from the start position even when the vehicle is not stopped in the predetermined range.

Supplementary Note 2

An automatic parking management apparatus described in Supplementary Note 2 is further provided with a prohibitor, (i) which is configured to allow a start of the automatic parking control of the vehicle if it is determined that the vehicle is stopped in the predetermined range, and (ii) which is configured to prohibit the start of the automatic parking control of the vehicle if it is determined that the vehicle is not stopped in the predetermined range.

According to the automatic parking management apparatus described in Supplementary Note 2, when the vehicle is not stopped in the predetermined range, the start of the automatic parking control is prohibited. It is thus possible to prevent the automatic parking control from being started in an inappropriate condition (e.g., in a condition in which the position or posture of the vehicle cannot be accurately known).

Supplementary Note 3

In an automatic parking management apparatus described in Supplementary Note 3, if it is determined that the vehicle is not stopped in the predetermined range, the instructor is configured (i) to output an instruction to move the vehicle into the predetermined range by automatic travel when the vehicle is stopped in an allowed area, which is set around the predetermined range, and (ii) to output an instruction to move the vehicle into the predetermined range by manual travel when the vehicle is stopped outside the allowed area.

According to the automatic parking management apparatus described in Supplementary Note 3, the "allowed area" in which the vehicle can be safely moved into the predetermined range by automatic travel is set around the predetermined range. The instruction to move the vehicle into the predetermined range by automatic travel is outputted when the vehicle is stopped in the allowed area, whereas the instruction to move the vehicle into the predetermined range by manual travel is outputted when the vehicle is stopped outside the allowed area. By outputting the instruction in this manner, it is possible to move the vehicle into the predetermined range, more preferably.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An automatic parking management apparatus, which is applied to a parking lot and performing an automatic parking control to automatically park a vehicle, which is stopped at a start position where a camera is placed in the parking lot configured to image, into a parking space, said automatic parking management apparatus configured to:
    determine whether or not the vehicle is stopped in the start position, when the automatic parking control is intended to be started;
    determine whether or not the vehicle is stopped in an angle of view of the camera;
    output an instruction to move the vehicle into the start position by automatic travel, if it is determined that the vehicle is not stopped at the start position, and the vehicle is stopped in the angle of view of the camera, when the automatic parking control is intended to be started; and
    cause the vehicle to move into the start position by automatic travel if it is determined that the vehicle is not stopped at the start position, and the vehicle is stopped in the angle of view of the camera, when the automatic parking control is intended to be started.

2. The automatic parking management apparatus according to claim 1, further configured to:
    allow a start of the automatic parking control of the vehicle if it is determined that the vehicle is stopped in the start position, and prohibit the start of the automatic parking control of the vehicle if it is determined that the vehicle is not stopped in the start position.

3. The automatic parking management apparatus according to claim 1, further configured to:
    output an instruction to move the vehicle into the start position by automatic travel when the vehicle is stopped in an allowed area, which is set around the start position and included within the angle of view of the camera, and output an instruction to move the vehicle into the start position by manual travel when the vehicle is stopped outside the allowed area.

4. An automatic parking management apparatus, which is applied to a parking lot and performing an automatic parking control to automatically park a vehicle, which is stopped at a start position where a camera is placed in the parking lot configured to image, into a parking space, said automatic parking management apparatus configured to:
    determine whether or not the vehicle is stopped in an angle of view of the camera when the automatic parking control is intended to be started;
    output an instruction to move the vehicle into the start position by manual travel, if it is determined that the vehicle is not stopped in the angle of view of the camera, when the automatic parking control is intended to be started; and
    cause the vehicle to move into the start position by automatic travel if it is determined that the vehicle is not stopped at the start position, and the vehicle is stopped in the angle of view of the camera, when the automatic parking control is intended to be started.

5. The automatic parking management apparatus according to claim 4, further configured to:
    determine whether or not the vehicle is stopped in the start position; and
    allow a start of the automatic parking control of the vehicle if it is determined that the vehicle is stopped in the start position, and prohibit the start of the automatic parking control of the vehicle if it is determined that the vehicle is not stopped in the start position.

6. The automatic parking management apparatus according to claim 4, further configured to:
    determine whether or not the vehicle is stopped in the start position; and
    output an instruction to move the vehicle into the start position by automatic travel when the vehicle is stopped in an allowed area, which is set around the start position and included within the angle of view of the camera, and output an instruction to move the vehicle into the start position by manual travel when the vehicle is stopped outside the allowed area.

* * * * *